UNITED STATES PATENT OFFICE.

JOHN WALKER LEITCH, OF HUDDERSFIELD, ENGLAND.

METHOD OF CONCENTRATING SULFURIC ACID.

1,257,895. Specification of Letters Patent. Patented Feb. 26, 1918.

No Drawing. Original application filed December 14, 1915, Serial No. 66,784. Divided and this application filed October 11, 1917. Serial No. 196,011.

*To all whom it may concern:*

Be it known that I, JOHN WALKER LEITCH, a subject of the King of Great Britain, residing in Huddersfield, England, have invented a certain new and useful Improved Method of Concentrating Sulfuric Acid, of which the following is a specification.

The present application is divided from my original application for improvements in concentrating sulfuric acid filed on 14th December, 1915, under Serial No. 66784, and it consists in an improved method of effecting such concentration.

It has been previously proposed to concentrate sulfuric acid by the cascade method in two stages, a preliminary stage, in the open flue or above the furnace, and a final stage in a series of basins arranged in a closed chamber from which the products of evaporation are withdrawn. It has also been proposed that such closed chamber be constructed as a muffler about which hot gases may be circulated. Where high concentration is required it has been proposed to carry out the final step of the concentration in an iron basin, so that it may be more correct to describe such a process as a three-stage process.

The improved method, the object of this invention, is a three-stage cycle concentration process, similar to that just mentioned and adapted for highly concentrating sulfuric acid to a strength of 96–98 per cent. continuously in large quantities.

In carrying out the process in practice, continuously fed dilute sulfuric acid is, during the first of the three stages of the cascade cycle concentrated to a strength of 75–80 per cent. by either preheating the dilute acid to a temperature of from 100° C. to 120° C. or by raising the temperature of the acid to that extent at the commencement of the stage, and during this said stage increasing the temperature of the acid so that at the end of the stage the temperature will be between 135° C. and 150° C. Any vapors given off during this first stage may be allowed to escape into the atmosphere, as they are practically water vapors.

During the second stage of the cycle, the acid produced during the first stage is concentrated to a strength of 85–90 per cent. the temperature of the acid during this second stage being raised so that at the end of the stage the temperature will be between 200° C. and 215° C. The steam containing sulfuric acid and other acid evolved from the hot sulfuric acid during this stage are collected and condensed outside the concentrating or rectifying cycle. The resulting acid condensate is led away to pass again into the first stage of the cycle.

During the third stage of the cycle, the acid produced in the second stage is concentrated to 96–98 per cent., the temperature of the acid at the commencement of this stage being raised to a minimum temperature of 260° C. and during its passage through the stage raised still further but not exceeding a maximum of 325° C.

The vapors given off during the third stage are collected and led into direct contact with the dilute acid passing or being fed to the first concentrating stage, the flow of the vapors being effected in a direction counter to that of the said dilute acid. By the meeting of the vapors with the cool feed acid the acid becomes heated while the vapors, owing to the partial condensation that ensues, are deprived or stripped of the large proportion of their acid which is retained within the rectifying cycle and passed again through the first and succeeding concentrating stages.

Retaining the vapors within the rectifying cycle materially affects (*a*) the production, because at the high temperature which the vapors have attained, the quantity of acid distilled is very considerable and if not retained in the cycle by meeting the cool feed acid would have to pass out of it and add greatly to the quantity and the strength of the spent or weak acid produced by the rectification—the more intense the heating the greater is the quantity of feed acid which may be led into contact with the acid vapors without decreasing the strength of the finished acid—and (*b*) the strength, because owing to this dephlegmating part of the process it is possible to heat much more intensely and thus obtain higher strength in the acid remaining and running out of the third stage than would be possible if no dephlegmation formed part of the process.

The vapors which, after meeting with the feed acid, remain uncondensed are weak and therefore unimportant in quantity. They, like the vapors from the second stage, may be condensed and the resulting condensate led away to pass again through the stages of the cycle. That part of the process wherein the acid is vaporized and condensed is most important as it renders possible the production of high strength and high quantity without at the same time the production of a great quantity of spent acid which when 96-98% is desired, is very considerable, if not prohibitive, in known processes.

The concentrated acid passing out of the third stage before being stored away for use, is subjected to a cooling, and preferably an air cooling, process.

An appropriate apparatus for carrying out my improved method of concentrating sulfuric acid, I have already described and illustrated in my co-pending application above alluded to, so it is unnecessary to describe such apparatus again here.

Having thus described the nature of the said invention and the best means I know of carrying the same into practical effect, I claim:—

2. A continuous process, for concentrating dilute surfuric acid in a three-stage cascade cycle to a strength of 96-98 per cent., which consists in concentrating in the first stage of the cycle continuously fed acid to a strength of 75-80 per cent., concentrating in the second stage the acid thus produced to a strength of 85-90 per cent., concentrating in the third stage the acid from the second stage to a strength of 96-98 per cent. and collecting vapors from the third stage of the cycle and leading the vapors into direct contact with dilute acid passing to the first concentrating stage, the flow of the vapor being effected in a direction counter to that of the dilute acid, thereby substantially condensing the acid in the vapors while incidentally preheating the dilute acid in its passage to the said first stage.

2. A continuous process, for concentrating dilute sulfuric acid in a three-stage cascade cycle to a strength of 96-98 per cent., which consists in concentrating in the first stage of the cycle continuously fed acid to a strength of 75-80 per cent., concentrating in the second stage the acid thus produced to a strength of 85-90 per cent., concentrating in the third stage the acid from the second stage to a strength of 96-98 per cent., maintaining the temperature of the acid as it passes to the first stage of concentration at from 100° C. to 120° C., raising it during the first stage to a temperature between 135° C. and 150° C., during the second stage to a temperature between 200° C. to 215° C. and during the third stage from a minimum of 260° C. at the commencement to a maximum of 325° C. at the end of the stage, and collecting vapors from the third stage of the cycle and leading the vapors into direct contact with dilute acid passing to the first concentrating stage, the flow of the vapor being effected in a direction counter to that of the dilute acid, thereby substantially condensing the acid in the vapors while incidentally preheating the dilute acid in its passage to the said first stage.

3. A continuous process, for concentrating dilute sulfuric acid in a three-stage cascade cycle to a strength of 96-98 per cent., which consists in concentrating in the first stage of the cycle continuously fed acid to a strength of 75-80 per cent., concentrating in the second stage the acid thus produced to a strength of 85-90 per cent., concentrating in the third stage the acid from the second stage to a strength of 96-98 per cent., collecting vapors from the final stage of concentration, mixing these vapors with dilute acid being fed to the said first concentrating stage, thereby heating the fed dilute acid and partially condensing the vapors, and then condensing the remaining condensable portions of the said vapors and submitting the resulting condensate to the first concentrating stage.

4. A continuous process, for concentrating dilute sulfuric acid in a three-stage cascade cycle to a strength of 96-98 per cent., which consists in concentrating in the first stage of the cycle continuously fed acid to a strength of 75-80 per cent., concentrating in the second stage the acid thus produced to a strength of 85-90 per cent., concentrating in the third stage the acid from the second stage to a strength of 96-98 per cent., collecting separately vapors from the second and third concentration stages, mixing the vapors collected from the third stage with the dilute acid passing to the first stage of concentration, thereby heating the fed dilute acid and condensing a part of the vapors and then condensing the remaining condensable portions of the last said vapors together with the condensable portions of the vapors collected from the second concentrating stage, and submitting the combined resulting condensate to the first concentrating stage.

5. A continuous process, for concentrating dilute sulfuric acid in a three-stage cascade cycle to a strength of 96-98 per cent., which consists in concentrating in the first stage of the cycle continuously fed acid to a strength of 75-80 per cent., concentrating in the second stage the acid thus produced to a strength of 85-90 per cent., concentrating in the third stage the acid from the second stage to a strength of 96-98 per cent., collecting vapors from the third stage of the cycle and leading the vapors into direct contact with dilute acid passing to the first concentrating stage, the flow of the vapor being effected in a direction counter to that of the dilute acid, thereby substantially condensing the acid in the vapors while incidentally preheating the dilute acid in its passage to the said first stage, and finally air cooling the concentrated acid produced during the third stage.

In testimony whereof I have signed my name to this specification in the presence of two subscribing witnesses.

JOHN WALKER LEITCH.

Witnesses:
 CHARLES HALE,
 ALFRED BROOKE.